(12) United States Patent
Hammons, Jr.

(10) Patent No.: US 7,675,990 B2
(45) Date of Patent: Mar. 9, 2010

(54) SPACE-TIME CODES FOR LINEARLY LABELLED PAM, PSK, QAM AND RELATED CONSTELLATIONS USING GRAY MAPPING

(75) Inventor: Arthur R. Hammons, Jr., North Potomac, MD (US)

(73) Assignee: The Johns Hopkins University, Baltimore, MD (US)

( * ) Notice: Subject to any disclaimer, the term of this patent is extended or adjusted under 35 U.S.C. 154(b) by 803 days.

(21) Appl. No.: 11/552,444

(22) Filed: Oct. 24, 2006

(65) Prior Publication Data

US 2007/0183528 A1   Aug. 9, 2007

Related U.S. Application Data

(60) Provisional application No. 60/729,522, filed on Oct. 24, 2005.

(51) Int. Cl.
    H04B 7/02    (2006.01)
(52) U.S. Cl. ..................................................... 375/267
(58) Field of Classification Search ................. 375/259, 375/260, 267, 286, 295
    See application file for complete search history.

(56) References Cited

U.S. PATENT DOCUMENTS

| 4,646,326 | A * | 2/1987 | Backof et al. ............... 375/261 |
| 6,678,263 | B1 * | 1/2004 | Hammons, Jr. et al. ..... 370/342 |
| 6,700,926 | B1 | 3/2004 | Heikkila et al. |
| 2002/0122502 | A1 | 9/2002 | El-Gamal et al. |
| 2002/0165626 | A1 | 11/2002 | Hammons, Jr. et al. |
| 2004/0081074 | A1 | 4/2004 | Piechocki |
| 2004/0151256 | A1 | 8/2004 | Hwang et al. |
| 2005/0220210 | A1 | 10/2005 | Hammons, Jr. |

FOREIGN PATENT DOCUMENTS

EP    1267508 A1    12/2002

OTHER PUBLICATIONS

Hsiao-Feng (Francis) Lu et al., "A Unified Construction of Space-Time Codes ... ," IEEE Transactions on Information Theory, vol. 51, No. 5, May 2005, pp. 1709-1730.
Youjian (Eugene) Liu et al., "A Rank Criterion for QAM Space-Time Codes," IEEE Transactions on Information Theory, Dec. 2002, pp. 3062-3079, vol. 48, No. 12, IEEE, New York NY.
Hsiao-Feng Lu et al., "Rate Diversity Tradeoff of Space-Time Codes with ... ," IEEE Transactions on Information Theory, Oct. 2003, pp. 2747-2751, vol. 49, No. 10, IEEE, NY NY.

(Continued)

*Primary Examiner*—Kevin M Burd
(74) *Attorney, Agent, or Firm*—Albert J. Fasulo, II

(57) ABSTRACT

General algebraic space-time code constructions are presented for Gray-mapped $2^K$-PSK, $2^K$-PAM, and $4^K$-QAM constellations. The space-time codes achieve the rate-diversity tradeoff—i.e., they allow the transmission of information at the maximum rate possible for the given signaling constellation and the achieved transmit diversity level. New codes created by applying a nonsingular linear or affine transformation to the constellation labels retain the optimality of the original codes with respect to the rate-diversity tradeoff. Extensions to $p^K$-PSK, $p^K$-PAM, $p^{2K}$-QAM, and related constellations, for p prime, are also given.

23 Claims, 3 Drawing Sheets

OTHER PUBLICATIONS

Vahid Tarokh et al, "Space-Time Codes for High Data Rate . . . ," IEEE Transactions on Information Theory, Mar. 1998, pp. 744-759, vol. 44, No. 2, IEEE, New York, NY.

A. Roger Hammons, Jr., et al., "On the Theory of space-Time Codes . . . ," IEEE Transactions on Information Theory, Mar. 2000, pp. 524-542, vol. 46, No. 2, IEEE New York NY.

Hsiao-Feng Lu et al., "Generalized Unified Construction of Space-Time Codes with Optimal . . . ," ISIT 2004, Jun. 27-Jul. 12, 2004, p. 99, IEEE New York NY.

Hsiao-Feng Lu et al., "Rate-Diversity Tradeoff of Space-Time Codes with Fixed . . . ," ISIT 2003, Jun. 29-Jul. 4, 2003, p. 242, IEEE New York NY.

* cited by examiner

SPACE-TIME CODES FOR LINEARLY LABELLED PAM, PSK, QAM AND RELATED CONSTELLATIONS USING GRAY MAPPING

CROSS-REFERENCE TO RELATED APPLICATIONS

This application claims the benefit of prior filed U.S. provisional Application No. 60/729,522, filed on Oct. 24, 2005, and incorporated fully herein by reference.

STATEMENT OF GOVERNMENTAL INTEREST

This invention was made with Government support under National Science Foundation Grant No. CCR-0325781. The Government has certain rights in the invention.

BACKGROUND OF THE INVENTION

1. Field of the Invention

This invention relates to the field of space-time codes for linearly labelled constellations, and more particularly, to a method, system, and computer program product for constructing space-time codes for linearly labelled constellations using Gray mapping.

2. Description of the Related Art

I. Introduction

Recent advances in coding theory include space-time codes which provide diversity in multiple-input multiple-output (MIMO) antenna systems over fading channels with channel coding across a small number of transmit antennas. For wireless communication systems, a number of challenges arise from the harsh RF propagation environment characterized by channel fading and co-channel interference (CCI). Channel fading can be attributed to diffuse and specular multipath, while CCI arises from reuse of radio resources. Interleaved coded modulation on the transmit side of the system and multiple antennas on the receive side are standard methods used in wireless communication systems to combat time-varying fading and to mitigate interference. Both are examples of diversity techniques.

Simple transmit diversity schemes (in which, for example, a delayed replica of the transmitted signal is retransmitted through a second, spatially-independent antenna and the two signals are coherently combined at the receiver by a channel equalizer) have also been considered within the wireless communications industry as a method to combat multipath fading. From a coding perspective, such transmit diversity schemes amount to repetition codes and encourage consideration of more sophisticated code designs. Information-theoretic studies have demonstrated that the capacity of multi-antenna systems significantly exceeds that of conventional single-antenna systems for fading channels. The challenge of designing channel codes for high capacity multi-antenna systems has led to the development of "space-time codes," in which coding is performed across the spatial dimension (e.g., antenna channels) as well as time.

Space-time codes are designed for MIMO communication systems that employ multiple transmit antennas to achieve spatial diversity. The modulated code words are often presented as complex-values M×T matrices in which the (m,t)-th entry sm,t represents the discrete baseband signal transmitted from the m-th transmit antenna at time t. The initial work on space-time codes by Guey et al. and Tarokh et al. showed that the transmit diversity achieved by a space-time code is equal to the minimum rank among the set of matrices produced as differences between distinct modulated code words. There is a tradeoff between achievable transmission rate and achievable transmit diversity level for space-time codes. Full-rank space-time codes can achieve transmission rates no greater than one symbol per transmission interval. For rank d space-time codes, the maximum transmission rate is M−d+1 symbols per transmission interval. Equivalently, the size of an M×T rank-d space-time code cannot exceed qT(M−d+1), where q is the size of the signaling constellation. Codes meeting this upper limit are referred to as maximal.

Let C be a linear error-correcting code of length MT, with M≦T, over the discrete alphabet $\Omega$. The code words of C are presented as M×T matrices in which the (m,t)-th entry $a_{m,t} \in \Omega$ represents the information symbol that is modulated and transmitted from the m-th transmit antenna at transmission interval t. If all of the modulated code word matrices have rank at least d over $\mathbb{C}$, then the space-time code is called an M×T rank-d code. In the special case that all of the modulated code words are of full rank M, the space-time code is called an M×T full-rank code. There is a tradeoff between achievable transmission rate and achievable transmit diversity level as dictated by the Singleton Bound. For rank d space-time codes, the maximum transmission rate is M−d+1 symbols per transmission interval.

In U.S. Pat. No. 6,678,263, Hammons and El Gamal developed the so-called binary rank criteria that allowed, for the first time, the algebraic design of space-time codes achieving maximal spatial diversity of all orders. From the binary rank criteria, they developed the general stacking construction for full-diversity space-time codes, examples of which include block codes derived from Galois fields and rings and rate 1/M convolutional codes of optimal $d_{free}$. The binary rank criteria showed that the algebraically-designed, full-rank, BPSK-modulated space-time codes could be lifted to full-rank, QPSK-modulated space-time codes. In particular, Hammons and El Gamal showed that, if the linear binary codes A and B produce full-rank space-time codes when BPSK modulated, then the quaternary code C=A+2B produces a full-rank space-time code under QPSK modulation. They referred to this construction as the dyadic construction.

Building on the Hammons-El Gamal framework, Lu and Kumar showed that the dyadic construction extends to $2^m$-PSK modulation in the natural way—i.e., if the linear binary codes $A_0, A_1, \ldots, A_{m-1}$ produce full-rank space-time codes under BPSK modulation, then the $2^m$-ary code $$C = \sum_{i=0}^{m-1} 2^i \mathcal{A}_i$$

produces a full-rank space-time code under $2^m$-PSK modulation. They showed that similar results apply to codes of rank d≦M. Furthermore, Lu and Kumar developed a unified space-time code construction that generalizes the basic $2^m$-PSK dyadic construction to produce space-time codes for $2^m$-PAM, $4^m$-QAM, and other exotic higher-order constellations that achieve the rate-diversity tradeoff. The Lu/Kumar construction of space-time codes are optimal for rate-diversity tradeoff but do not use Gray labeled constellations. Since Gray labeled $2^K$-PAM, $2^K$-PSK, and $4^K$-QAM is the usual practice in communication systems (because for most channels this labeling minimizes the BER at high SNR), the Lu/Kumar construction has deficiencies.

In U.S. Pat. No. 6,678,263, Hammons and El Gamal showed also that the BPSK and QPSK space-time code constructions admit certain binary transformations that preserve the rank properties of the modulated space-time codes.

SUMMARY OF THE INVENTION

In this application, it is shown that similar results apply to the Lu/Kumar basic constructions for $2^K$-PSK, $2^K$-PAM, and $4^K$-QAM space-time codes. In particular, this refinement provides new algebraic space-time codes that are suitable for use when, as in the usual practice, Gray mapping is used to label the signaling constellations.

This invention shows how to construct space-time codes for $2^K$-PAM, $2^K$-PSK, and $4^K$-QAM modulation that are suitable for different labelings of the constellation points. One way this is done is by introducing transformation into basic space-time code constructions by Lu/Kumar. Details of the new construction are set forth below. The present invention, as set forth herein, establishes that any linear transformation will preserve the codes' optimal rate-vs-diversity properties. Explicit transformations are given to produce new codes suitable for Gray labeled $2^K$-PAM, $2^K$-PSK, and $4^K$-QAM.

BRIEF DESCRIPTION OF THE DRAWINGS

The various aspects, advantages and novel features of the present invention will be more readily comprehended from the following detailed description when read in conjunction with the appended drawings in which.

DETAILED DESCRIPTION

Figure 1:
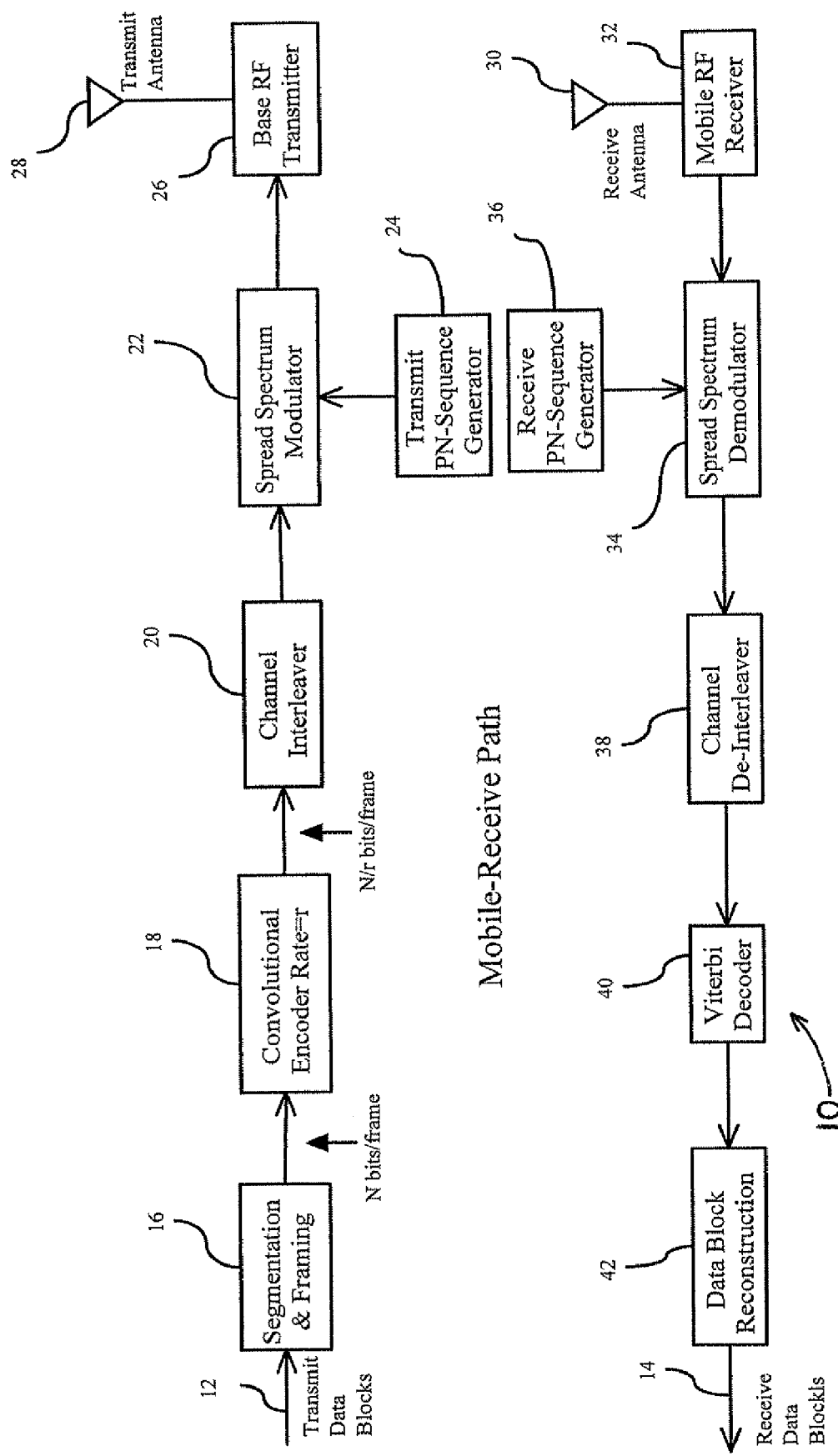
FIG. 1 is a block diagram of an exemplary digital cellular Direct Sequence Code Division Multiple Access (DS-CDMA) base-station-to-mobile-station (or forward) link.

Referring to FIG. 1, by way of an example, a conventional digital cellular Direct Sequence Code Division Multiple Access (DSCDMA) base-station-to-mobile-station (or forward) link 10 is shown using a conventional convolutional encoder and Viterbi decoder. FIG. 1 also illustrates the mobile-station-to-base-station (or reverse) link.

At the transmit end, the system 10 in FIG. 1 comprises a data segmentation and framing module 16 where user information bits are assembled into fixed length frames from transmit data blocks 12. The N bits per frame are input to the base station's convolutional encoder 18 of rate r, which produces N/r code symbols at the input of the channel interleaver 20. The channel interleaver 20 performs pseudo-random shuffling of code symbols, and outputs the re-arranged symbols to the spread spectrum modulator 22. The spread spectrum modulator 22 uses a user-specific transmit PN-code generator 24 to produce a spread spectrum signal which is carried on a RF carrier to the transmitter 26, where a high power amplifier coupled to the transmit antenna 28 radiates the signal to the base station. The techniques of spread spectrum modulation and RF transmission are well known art to one familiar with spread spectrum communications systems.

The signal received at the mobile station antenna 30 is amplified in the RF receiver 32 and demodulated by the spread spectrum demodulator 34, which uses the same PN-code generator 36 as used by the base station transmitter to de-spread the signal. The demodulated symbols are de-interleaved by the channel de-interleaver 38 and input to the Viterbi decoder 40. The decoded information bits are reconstructed using data block reconstruction 42 into receive data blocks 14 and forwarded to the data terminal equipment at the receive end.

Figure 2:
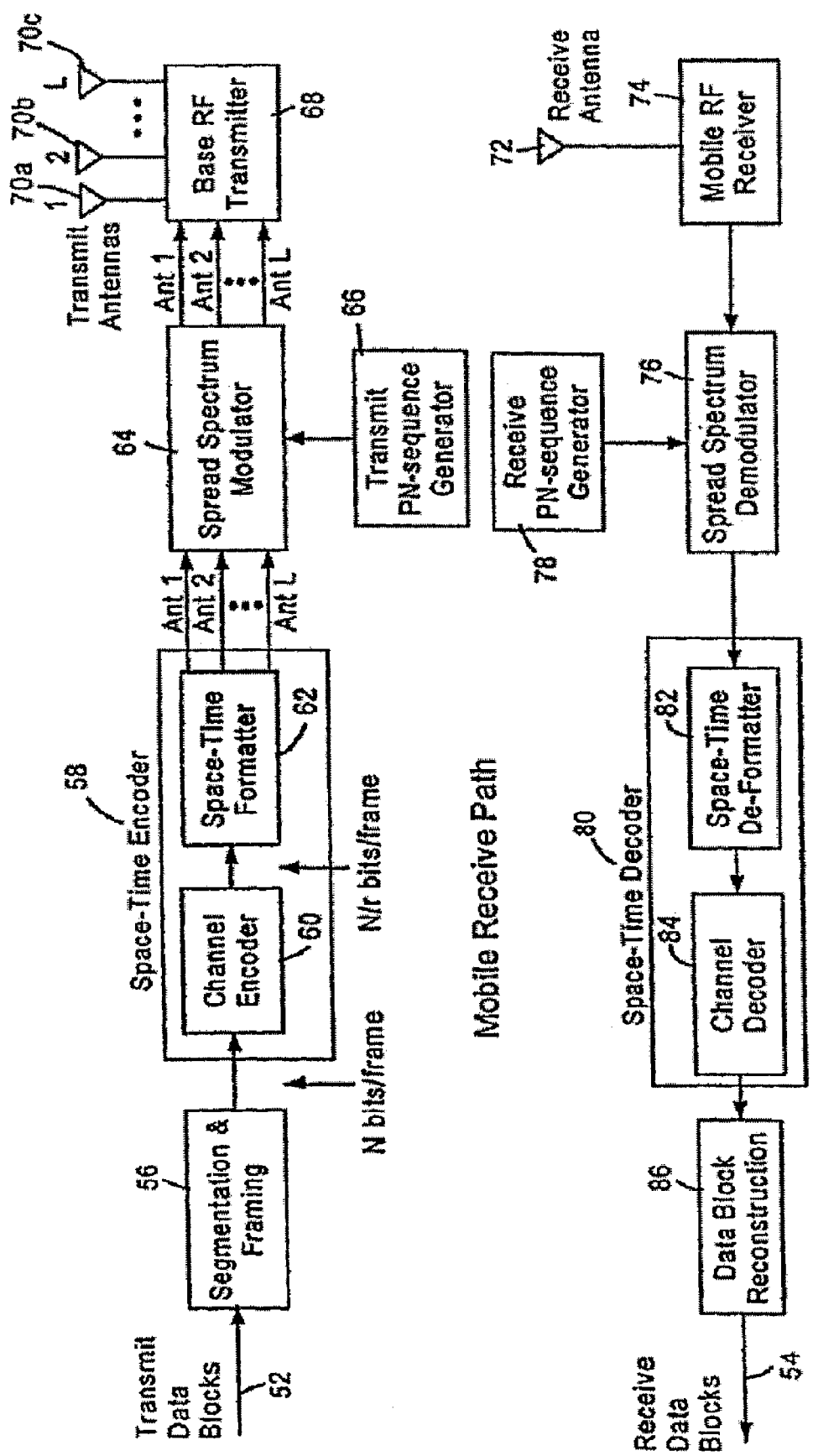
FIG. 2 is a block diagram of a system for a digital cellular system which implements space-time encoding and decoding in accordance with an embodiment of the present invention.

With reference to FIG. 2, a digital cellular base-station-to-mobile-station link is shown to illustrate the implementation of space-time encoding and decoding in accordance with an embodiment of the present invention. While CDMA system is used as an example, one familiar with the art would consider the present invention applicable to other types of wireless systems, which can employ other types of multiple access methods such as frequency division multiple access (FDMA), time division multiple access (TDMA), and hybrid methods.

Transmit data blocks 52 from the data terminal equipment are segmented and framed 56 into fixed frame length and applied to the mobile's channel space-time encoder 58. The output from a channel encoder 60 is fed to the space-time formatter 62 which determines the parsing (allocation and presentation order) of the coded symbols to the various transmit antennas 70a, 70b, 70c. The spatial formatter output is applied to the spread spectrum modulator 64 which uses a user specific PN-code generator 66 to create spread spectrum signals, carried on a RF carrier via base RF transmitter 68, to the mobile station transmitter. The transmitter, with high power amplifier coupled to the Transmit antenna, radiates the signals via separate transmit antennas to the mobile station.

The signal received at one or more mobile station antenna(s) 72 is amplified in the mobile RF receiver 74 and demodulated in a phase shift keying demodulator 76, which uses the same PN-code generator 78 as used by the base station transmitter, to de-spread the signal. The demodulated symbols are processed at space-time decoder 80 by the space-time de-formatter 82 and input to the channel decoder 84. The decoded information bits are reconstructed 86 into receive data blocks 54 and forwarded to the data terminal equipment at the receive end. Depending on the space-time code used, the de-formatter 82 and the decoder 84 can be grouped in a single maximum likelihood receiver.

Figure 3:
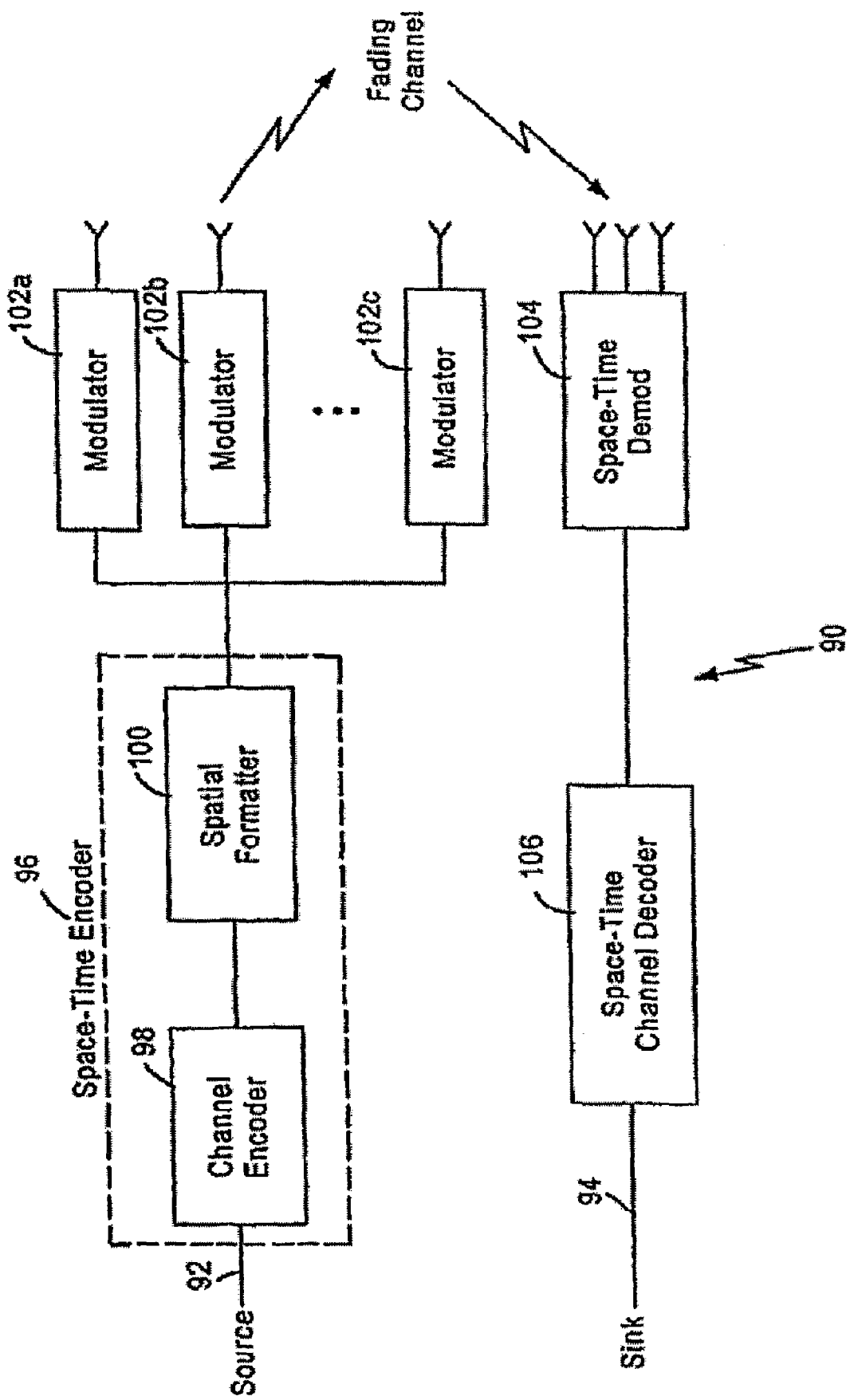
FIG. 3 is a block diagram illustrating space-time encoding and decoding in accordance with an embodiment of the present invention.

FIG. 3 illustrates an exemplary communication system 90 having a path 92 from a source and a path 94 to a sink and which can be a system other than a cellular system. The system 90 has a space-time encoder 96 that is similar to the encoder 58 depicted in FIG. 2 in that it comprises a constituent encoder 98 and a spatial formatter 100. Plural modulators 102a, 102b, 102c, and so on, are also provided. At the receiver end, a space-time demodulator 104 and a space-time decoder 106 are provided.

With continued reference to FIG. 3, the source generates k information symbols from a discrete alphabet X on the path 92 which are encoded by an error control code C by the space-time encoder 96. The space-time encoder 96 produces code words of length N over the symbol alphabet Y. The encoded symbols are mapped by the modulators 102a, 102b, 102c, and so on, onto constellation points from a discrete, complex-valued signaling constellation for transmission across the channel. The modulated radio frequency signals for all of the L transmit antennas 102a, 102b, 102c, and so on, are transmitted at the same time to the receiver space-time demodulator 104. The space-time channel decoder 106 decodes the signals to the received data path 94. As shown, the receiver provides M receive antennas to collect the incoming transmissions. The received baseband signals are subsequently decoded by the space-time decoder 106.

The present invention is concerned primarily with the design of space-time codes rather than the signal processing required to decode them. In most cases, the decoding employs known signal processing for maximum likelihood detection.

In the following discussion, notation is established and certain key ideas of the Lu-Kumar approach, upon which the novel space-time code constructions of the present invention are built, are explained. Following the discussion of the Lu-Kumar approach, new constructions of space-time codes for applying linear and affine transformations to the space-time code constructions proposed by Lu and Kumar, in accordance with the present invention, are described. As described, the proper choice of transformation yields new algebraic space-time codes that are compatible with Gray labelling.

II. Preliminaries

We consider algebraic space-time code design based on the ring $\mathbb{Z}[\theta]$ of algebraic integers with $\theta$ a complex root of unity. The connection between modulated space-time codes, with entries from $\mathbb{Z}[\theta] \subset \mathbb{C}$, and binary codes over $\mathbb{F}=\{0,1\}$ is through the isomorphism $\mathbb{Z}[\theta]/(1-\theta) \cong \mathbb{F}$. We will let $\mu: \mathbb{Z}[\theta] \to \mathbb{C}$ denote the corresponding projection modulo $1-\theta$. The following results from Lu and Kumar underlie the space-time code constructions.

Proposition 1 Let $\theta$ be a complex, primitive $2^v$-th root of unity. For $0 \leq l < v$, let $\Delta s = \theta^{2^l m} - \theta^{2^l n}$, where m and n are integers. Then, $(1-\theta^{2^l})|\Delta s$ in $\mathbb{Z}[\theta]$. Furthermore, $$\frac{\Delta s}{1-\theta^{2^l}} \equiv \overline{m} \oplus \overline{n} \pmod{1-\theta},$$

where $\overline{m}$ and $\overline{n}$ denote the modulo 2 projections of m and n, respectively, and $\oplus$ denotes modulo 2 addition.

Proposition 2 Let C be complex M×T matrix, (M≤T), with entries from $\mathbb{Z}[\theta]$. If the binary projection $\mu(C)$ is of rank d over $\mathbb{F}$, then C is of rank at least d over $\mathbb{C}$.

The following notation will be used. The set of M×T matrices over an alphabet $\Omega$ will be denoted by $\Omega^{M \times T}$. When $A=[i,j]$ is a matrix with entries in $\mathbb{Z}_{2^K}$, we write $\theta^A$ for the matrix whose (i,j)-th entry is $\theta^{a_{i,j}}$. For matrices A and B, the matrix $A \odot B$ is their Hermitian (i.e., componentwise) product.

III. New Space-Time Code Constructions

Let $\tau: \mathbb{F}^v \to \mathbb{F}^v$ be a linear transformation. We can extend this map to a linear transformation $\tau: (\mathbb{F}^{M \times T})^v \to (\mathbb{F}^{M \times T})^v$, acting on v-tuples of M×T binary matrices, as follows. Let $\overline{A}=(A_0, A_1, \ldots, A_{v-1}) \in (\mathbb{F}^{M \times T})^v$, where $A_i$ is an M×T matrix whose (m, t)-th entry is $a_{m,t}^{(i)}$. Then $\tau(\overline{A})$ is the matrix whose (m, t)-th entry is $\tau(a_{m,t}^{(0)}, a_{m,t}^{(1)}, \ldots, a_{m,t}^{(v-1)})$. The component mappings $\tau_0: \tau_1, \ldots, \tau_{v-1}$ of $\tau$ are defined by the relationship $\tau(\overline{A})=(\tau_0(\overline{A}), \tau_1(\overline{A}), \ldots, \tau_{84-1}(\overline{A}))$. The following straightforward properties of $\tau$ are worth special note.

Lemma 3 The linear transformation $\tau$ is nonsingular over $\mathbb{F}^v$ if and only if its extension is nonsingular over $(\mathbb{F}^{M \times T})^v$.

Lemma 4 If A is a linear binary code, then $\tau(A^v) \subset A^v$.

When $v=KU$, we will use $A^{KU}$ and $$\overbrace{\mathcal{A}^K \times \mathcal{A} \times \ldots \times \mathcal{A}^K}^{U \text{ times}}$$

interchangeably as convenient.

A. $2^K$-PSK Modulation

The $2^K$-PSK constellation consists of the points $$s = \theta^{a_0 + 2a_1 + \ldots + 2^{K-1}a_{K-1}}, \tag{1}$$

for $\overline{a}=(a_0, a_1, \ldots, a_{K-1}) \in \mathbb{F}^K$, where $\theta$ is a complex, primitive $2^K$-th root of unity.

For $\overline{A} \in \mathbb{F}^{M \times T}$, let the notation $\theta(\overline{A})$ be shorthand for $\theta^{A_0 + 2A_1 + \ldots + 2^{K-1}A_{K-1}}$. From the dyadic construction, we know that $S=\{\theta(\overline{A}): \overline{A} \in A^K\}$ is an M×T space-time code achieving the rate-diversity tradeoff. The following theorem provides a generalization of the PSK dyadic construction.

Theorem 5 Let $\theta$ be a complex, primitive $2^K$-th root of unity. Let A be a linear binary M×T maximal rank d code, and let $\tau: \mathbb{F}^K \to \mathbb{F}^K$ be a nonsingular linear transformation. Then $S^\tau = \{\theta(\tau(\overline{A})): \overline{A} \in A^K\}$ is an M×T space-time code that achieves the rate-diversity tradeoff for $2^K$-PSK modulation.

Proof: That $S^\tau$ achieves the proper transmission rate follows immediately from the fact that A is maximal. It therefore suffices to show that the difference between distinct code words in $S^\tau$ has rank at least d.

Let $\overline{A}, \overline{A}' \in A^K$ with $\overline{A} \neq \overline{A}'$. By Lemma 3, since $\tau$ is nonsingular over $(\mathbb{F}^{M \times T})^K$, we have $\tau(\overline{A}) \neq \tau(\overline{A}')$. Let l be the first index i for which $\tau_i(\overline{A}) \neq \tau_i(\overline{A}')$. Then, by Proposition 1, $$\frac{\theta(\tau(\overline{A})) - \theta(\tau(\overline{A}'))}{1-\theta^{2^l}} \equiv \tau_l(\overline{A}) \oplus \tau_l(\overline{A}') \pmod{1-\theta}. \tag{2}$$

Since $\tau_l(\overline{A}), \tau_l(\overline{A}') \in A$ by Lemma 4 and A is a maximal rank d code, we have $\tau_l(\overline{A}) \oplus \tau_l(\overline{A}')$ is of rank at least d over $\mathbb{F}$. Hence, by Proposition 2, $\theta(\tau(\overline{A})) - \theta(\tau(\overline{A}'))$ is of rank at least d over $\mathbb{C}$, which completes the proof.

B. $2^K$-PAM Modulation

The $2^K$-PAM constellation consists of the points $$s = \sum_{k=0}^{K-1} 2^k (-1)^{a_k}, \tag{3}$$

for $\overline{a}=(a_0, a_1, \ldots, a_{K-1}) \in \mathbb{F}^K$. With this representation, Lu and Kumar showed that a PAM-modulated space-time code with optimal rate-diversity tradeoff is produced when each parameter $a_k$ is replaced with a code word $A_k \in A$, where A is a linear binary maximal rank d code. The following result is a generalization of this basic PAM construction.

Theorem 6 Let A be a linear binary M×T maximal rank d code, and let $\tau: \mathbb{F}^K \to \mathbb{F}^K$ be a nonsingular linear transformation. Then $$S^\tau = \left\{ \sum_{k=0}^{K-1} 2^k (-1)^{\tau_k(\overline{A})} : \overline{A} \in A^K \right\}$$

is an M×T space-time code that achieves the rate-diversity tradeoff for $2^K$-PAM modulation.

Proof: Let $\overline{A}, \overline{A}' \in \mathcal{A}^K$ with $\overline{A} \neq \overline{A}'$. Consider the difference $\Delta S = S - S'$, where $S = \sum_{k=0}^{K-1} 2^k (-1)^{\tau_k(\overline{A})}$ and $S' = \sum_{k=0}^{K-1} 2^k (-1)^{\tau_k(\overline{A}')}$.

By Lemma 3, $\tau(\overline{A}) \neq \tau(\overline{A}')$. Let $l$ be the first index $i$ for which $\tau_i(\overline{A}) \neq \tau_i(\overline{A}')$. Then $$\frac{\Delta S}{2^{\ell+1}} = \frac{(-1)^{\tau_\ell(A)} - (-1)^{\tau_\ell(A')}}{2} + D, \quad (4)$$

where $$D = \sum_{k=1}^{K-\ell-1} 2^{k-1} \left[ (-1)^{\tau_{\ell+k}(A)} - (-1)^{\tau_{\ell+k}(A')} \right].$$

Applying Proposition 1 with $\nu=1$ and $\theta=1$ to (4), we find $$\frac{\Delta S}{2^{\ell+1}} \equiv \tau_\ell(\overline{A}) \oplus \tau_\ell(\overline{A}') \pmod 2.$$

By Lemma 4, $\tau_l(\overline{A}) \oplus \tau_l(\overline{A}') \in \mathcal{A}$. Hence, by Proposition 2 and choice of $A$ as a rank $d$ binary code, $\Delta S$ has rank at least $d$ over $\mathbb{C}$.

C. $4^K$-QAM Modulation

The $4^K$-QAM constellation consists of the points $$s = (1+i) \sum_{k=0}^{K-1} 2^k i^{a_k + 2 b_k}, \quad (5)$$

for $\overline{a} = (a_0, a_1, \ldots, a_{K-1})$ and $\overline{b} = (b_0, b_1, \ldots, b_{K-1})$ in $\mathbb{F}^K$. With this representation, Lu and Kumar [?] showed that a QAM-modulated space-time code with optimal rate-diversity tradeoff is produced when the parameters $a_k$ and $b_k$ are replaced with code words $A_k, B_k \in \mathcal{A}$, where $\mathcal{A}$ is a linear binary maximal rank $d$ code. This basic $4^K$-QAM construction is generalized by the following result.

Theorem 7 Let $\mathcal{A}$ be a linear binary M×T maximal rank $d$ code. Let $\tau: \mathbb{F}^{2K} \to \mathbb{F}^{2K}$ be a nonsingular linear transformation, with $\alpha(\overline{x}), \beta(\overline{x}) \in \mathbb{F}^K$ denoting the left and right halves of $\tau(\overline{x})$, respectively. Then $$S^\tau = \left\{ (1+i) \sum_{k=0}^{K-1} 2^k i^{\alpha_k(\overline{A},\overline{B}) + 2\beta_k(\overline{A},\overline{B})} : (\overline{A}, \overline{B}) \in \mathcal{A}^K \times \mathcal{A}^K \right\}$$

is an M×T space-time code that achieves the rate-diversity tradeoff for $4^K$-QAM modulation.

Proof: Let $S = (1+i) \sum_{u=0}^{K-1} 2^{k_i \alpha_k + 2\beta_k}$ and $S' = (1+i) \sum_{u=0}^{K-1} 2^{k_i \alpha'_k + 2\beta'_k}$ be distinct code words in $S^\tau$, where with some abuse of notation $\alpha_k$ denotes $\alpha_k(\overline{A}, \overline{B})$, $\alpha'_k$ denotes $\alpha_k(\overline{A}', \overline{B}')$, etc. Since $\tau$ is nonsingular, there is some $k$ for which either $\alpha_k \neq \alpha'_k$ or $\beta_k \neq \beta'_k$. Let $l$ denote the first index for which one of these inequalities occurs.

Case (i): $\alpha_l \neq \alpha'_l$.

Note that $$\Delta S = S - S' = 2^\ell (1+i) \left[ (i^{\alpha_\ell + 2\beta_\ell} - i^{\alpha'_\ell + 2\beta'_\ell}) + 2D \right],$$

where $$D = \sum_{i=0}^{K-\ell-2} 2^i (i^{\alpha_{\ell+i+1} + 2\beta_{\ell+i+1}} - i^{\alpha'_{\ell+i+1} + 2\beta'_{\ell+i+1}}).$$

So $$\frac{\Delta S}{2^\ell (1+i)(1-i)} = \left( \frac{i^{\alpha_\ell + 2\beta_\ell} - i^{\alpha'_\ell + 2\beta'_\ell}}{1-i} \right) + \left( \frac{2}{1-i} \right) D.$$

Applying Proposition 1 with $\nu=2$, we have $$\frac{\Delta S}{2^\ell (1+i)(1-i)} \equiv \alpha_\ell \oplus \alpha'_\ell \pmod{1-i}.$$

Since $\alpha_l \oplus \alpha'_l \in \mathcal{A}$, we have by Proposition 2 that $\Delta S$ has rank at least $d$ over $\mathbb{C}$.

Case (ii): $\alpha_l = \alpha'_l$ but $\beta_l \neq \beta'_l$.

In this case, $$\frac{\Delta S}{2^\ell (1+i)(1-i^2)} i^{\alpha_\ell} \odot \left( \frac{i^{2\beta_\ell} - i^{2\beta'_\ell}}{1-i^2} \right) + \left( \frac{2}{1-i^2} \right) D.$$

Applying Proposition 1 with $\nu=2$, $$\frac{\Delta S}{2^\ell (1+i)(1-i^2)} \equiv \beta_\ell \oplus \beta'_\ell \pmod{1-i}.$$

Since $\beta_l \oplus \beta'_l \in \mathcal{A}$, we have by Proposition 2 that $\Delta S$ has rank at least $d$ over $\mathbb{C}$.

IV. Application to Gray Mapping

One may interpret the mapping $\tau$ in Theorems 5 through 7 as changing the way the constellation is labelled. In this section, we show that the proper choice of $\tau$ enables the use of Gray labelling, which is common practice for these constellations.

For $2^K$-PSK and $2^K$-PAM, the constellation points have a natural ordering with parameterization by the integers $L=0, 1, 2, \ldots, 2^K-1$. For $2^K$-PSK, the $L$-th constellation point is $s_L = \theta^L$; for $2^K$-PAM, $s_L = 2L - (2^K - 1)$. Therefore, it is natural to assign $K$-bit labels to these constellation points by labelling $s_L$ with the binary expansion of $L$. Since $4^K$-QAM consists of two $2^K$-PAM constellations in quadrature, its natural labelling is the cross product of the constituent PAM labellings.

For signaling purposes, however, the natural labelling is usually not optimal. Over typical channels, the predominant symbol errors at sufficiently high signal-to-noise ratios are those in which the transmitted constellation point is mistaken for one of its adjacent neighbors. Under these conditions, the demodulated bit error rate depends asymptotically on the distribution of Hamming distances between labels of adjacent constellation points. The usual practice is to label $2^K$-PSK, $2^K$-PAM, and $4^K$-QAM constellations using a Gray mapping. A Gray mapping is a function that maps the natural constellation labels to a new set having the property that all adjacent labels differ in exactly one bit position. With Gray labelling, the demodulated bit error rate will then be asymptotically equal to the symbol error rate.

Consider the transformation $\zeta: \mathbb{F}^K \to \mathbb{F}^k$ in which the natural label $b_{K-1} \ldots b_1 b_0$ is mapped to the new label $a_{K-1} \ldots a_1 a_0$, with $$a_k = \begin{cases} b_k \oplus b_{k+1}, & \text{if } k < K-1 \\ b_{K-1}, & \text{if } k = K-1. \end{cases}$$

This transformation is a Gray mapping and is a nonsingular linear transformation over $\mathbb{F}^K$. Its inverse $\zeta^{-1}$ is defined by $$b_k = \begin{cases} \sum_{i=k}^{K-1} a_i \pmod{2}, & \text{if } k < K-1 \\ a_{K-1}, & \text{if } k = K-1. \end{cases}$$

For the PSK dyadic space-time code construction, the implicit constellation labelling is the natural one as given by equation (1). Therefore, by application of Theorem 5, we have the following result.

Corollary 8 Let A be a linear binary maximal rank d code, and let $\tau = \zeta^{-1}$ be the inverse Gray mapping. Then the space-time code $S^\tau$ described in Theorem 5 achieves the optimal rate-diversity tradeoff for the $2^K$-PSK constellation with Gray labelling.

For the basic PAM space-time code construction, the labelling is implicitly determined by equation (3). Note that $$\sum_{k=0}^{K-1} 2^k (-1)^{a_k} = -\sum_{k=0}^{K-1} 2^k (2a_k - 1) \tag{6}$$

$$= -\left[ 2\left( \sum_{k=0}^{K-1} 2^k a_k \right) - (2^K - 1) \right] \tag{7}$$

$$= -s_L, \tag{8}$$

where $L = \sum_{k=0}^{K-1} 2^k a_k$. Thus, the implicit constellation labelling used in (3) is the ones-complement of the natural labelling. This leads to the following result.

Corollary 9 Let A be a linear binary maximal rank d code, and let $\tau = \zeta^{-1}$ be the inverse Gray mapping. Then the space-time code $S^\tau$ described in Theorem 6 achieves the optimal rate-diversity tradeoff for a Gray-coded $2^K$-PAM constellation.

For the basic QAM space-time code construction, the labelling is implicitly determined by equation (5), from which we derive equations for the two PAM quadrature components. Note that $$(1+i) \sum_{k=0}^{K-1} 2^k i^{a_k + 2b_k} = \left[ \sum_{a_k=0} 2^k (-1)^{b_k} - \sum_{a_k=1} 2^k (-1)^{b_k} \right] + i \left[ \sum_{a_k=0} 2^k (-1)^{b_k} - \sum_{a_k=1} 2^k (-1)^{b_k} \right] \tag{9}$$

$$= \sum_{k=0}^{K-1} 2^k (-1)^{a_k \oplus b_k} + i \sum_{k=0}^{K-1} 2^k (-1)^{b_k}. \tag{10}$$

Comparing (8) and (10) leads to the following result.

Corollary 10 Let A be a linear binary maximal rank d code. Let $\tau$ be the linear transformation mapping $\bar{a}|\bar{b} \in \mathbb{F}^{2K}$ to $\zeta^{-1}(\bar{a}) \oplus \zeta^{-1}(\bar{b})|\zeta^{-1}(\bar{b}) \in \mathbb{F}^{2K}$. Then the space-time code $S^\tau$ described in Theorem 7 achieves the optimal rate-diversity tradeoff for a Gray-coded $4^K$-QAM constellation.

V. Extensions

Lu and Kumar developed a general space-time code construction unifying the algebraic constructions for $2^m$-PAM, $2^m$-PSK, and $4^m$-QAM constellations. This unified framework was further generalized by Hammons to provide space-time codes for other common AM-PSK modulation formats, which codes also achieve the rate-diversity trade-off. The theorems of section III likewise generalize to the unified frameworks. Application to the Lu-Kumar unified construction is addressed in this paper, whereas generalization to the AM-PSK cases will be presented separately.

A. Unification of PAM, PSK, and QAM Results

The constellation points for $2^m$-PAM, $2^m$-PSK, and $4^m$-QAM may be produced by the common formula $$s = \kappa \sum_{u=0}^{U-1} 2^u \theta^{\sum_{k=0}^{K-1} 2^k a_{u,k}} \tag{11}$$

through proper choice of parameters. Here $\kappa$ is a complex non-zero scalar, K and U are integers, $\theta$ is a primitive K-th root of unity, and $\bar{a} = (a_{00}, a_{01}, \ldots, a_{U-1,K-1}) \in \mathbb{F}^{KU}$ indexes the constellation points. For PAM, one chooses K=1, U=m, $\theta = -1$, $\kappa = 1$; for QAM, one chooses K=2, U=m, $\theta = i = \sqrt{-1}$, $\kappa = 1+i$; one chooses K=m, U=1, $\theta = e^{2\pi i/2^m}$, $\kappa = 1$. Different choices give other more exotic constellations.

Substituting maximal rank-d binary codes $A_{u,k}$ for parameters $a_{u,k}$ in (11) yields a general construction of space-time codes that achieve the rate-diversity trade-off.

We again introduce the linear transformation $\tau: \mathbb{F}^\nu \to \mathbb{F}^\nu$, this time with $\nu = KU$. In addition to the scalar components of $\tau$ defined previously, we also define its subvector components through the action $$\tau: \bar{x} \in \mathbb{F}^{KU} \mapsto (\tau_0(\bar{x}), \tau_1(\bar{x}), \ldots, \tau_{U-1}(\bar{x})) \in \mathbb{F}^K \times \ldots \times \mathbb{F}^K.$$

In this notation, the scalar components of $\tau$ are then indexed by the pairs (u, k) so that $$\tau_u(\bar{x}) = (\tau_{u,0}(\bar{x}), \tau_{u,1}(\bar{x}), \ldots, \tau_{u,K-1}(\bar{x})).$$

The following result generalizes Theorems 5, 6, and 7.

Theorem 11 Let A be a maximal M×T rank-d binary code. Let K and U be positive integers. Let $\kappa$ be a non-zero complex number, $\theta$ be a complex primitive $2^K$-th root of unity, and $\eta$ be a non-zero element of $2\mathbb{Z}[\theta]$. Let $\tau: \mathbb{F}^{KU} \to \mathbb{F}^{KU}$ be a nonsingular linear transformation.

Then the modulated space-time code defined by $$S^\tau = \left\{ \begin{array}{l} S = \kappa \sum_{u=0}^{U-1} \eta^u \theta(\tau_u(\tilde{A})): \\ \tilde{A} = (\bar{A}_0, \bar{A}_1, \ldots, \bar{A}_{U-1}) \in \mathcal{A}^K \times \ldots \times \mathcal{A}^K = \mathcal{A}^{KU} \end{array} \right\} \quad (12)$$

achieves transmit diversity d and transmission rate R=(KU) (M−d+1) bits per channel use, the maximum possible rate.

Proof: Let $S=\kappa\Sigma_{u=0}^{U-1}\eta^u\theta(\tau_u(\tilde{A}))$ and $S'=\kappa\Sigma_{u=0}^{U-1}\eta^u\theta(\tau_u(\tilde{A}'))$ be distinct code words in S. Let (u*, k*) denote the lexographically first index pair (u, k) for which $\tau_{u,k}(\tilde{A})\neq\tau_{u,k}(\tilde{A}')$. Then $$\Delta S = S - S' = \kappa\eta^{u^*}\theta^P \odot \left(\theta^{2^{k^*}}Q - \theta^{2^{k^*}}Q'\right) + \kappa\eta^{u^*+1}E, \quad (13)$$

where $$P = \sum_{i=0}^{k^*-1} 2^i \tau_{u^*,i}(\tilde{A}),$$

$$Q = \sum_{i=0}^{K-k^*-1} 2^i \tau_{u^*,k^*+i}(\tilde{A}),$$

$$Q' = \sum_{i=0}^{K-k^*-1} 2^i \tau_{u^*,k^*+i}(\tilde{A}'),$$

and $$E = \sum_{i=0}^{U-u^*-2} \eta^i \left[\theta(\tau_{u^*+i+1}(\tilde{A})) - \theta(\tau_{u^*+i+1}(\tilde{A}'))\right].$$

Then $$\frac{\Delta S}{\kappa\eta^{u^*}(1-\theta^{2^{k^*}})} = \theta^P \odot \left(\frac{\theta^{2^{k^*}}Q - \theta^{2^{k^*}}Q'}{1-\theta^{2^{k^*}}}\right) + \left(\frac{\eta}{1-\theta^{2^{k^*}}}\right)E. \quad (14)$$

The terms in parentheses on the right hand side are either scalars in $\mathbb{Z}[\theta]$ or matrices with entries in $\mathbb{Z}[\theta]$. The rightmost summand is congruent to 0 (mod 1−θ). Hence, $$\frac{\Delta S}{\kappa\eta^{u^*}(1-\theta^{2^{k^*}})} \equiv \tau_{u^*,k^*}(\tilde{A}) \oplus \tau_{u^*,k^*}(\tilde{A}') \pmod{1-\theta}. \quad (15)$$

Both $\tau_{u^*,k^*}(\tilde{A})$ and $\tau_{u^*,k^*}(\tilde{A}')$ are code words in A; hence, their sum has rank at least d over $\mathbb{F}$. By Corollary 2, ΔS is of rank at least d over $\mathbb{C}$, which completes the proof.

B. Affine Mappings

Consider the affine mapping σ: $\mathbb{F}^v \to \mathbb{F}^v$ given by $\sigma(\bar{x})=\tau(\bar{x})+\bar{a}$, where τ is the linear part of σ and $\bar{a}\in\mathbb{F}^v$ is a constant. For v=KU, the subvector components of σ are given by $\sigma_u(\bar{x})=\tau_u(\bar{x})+\bar{a}_u$.

The following result generalizes Theorem 11.

Theorem 12 Let A be a maximal M×T rank-d binary code. Let K and U be positive integers. Let κ be a non-zero complex number, θ be a complex primitive $2^K$-th root of unity, and η be a non-zero element of $2\mathbb{Z}[\theta]$. Let σ: $\mathbb{F}^{KU}\to\mathbb{F}^{KU}$ be an affine transformation whose linear part is nonsingular.

Then the modulated space-time code defined by $$S^\sigma = \left\{ \begin{array}{l} S = \kappa \sum_{u=0}^{U-1} \eta^u \theta(\sigma_u(\tilde{A})): \\ \tilde{A} = (\bar{A}_0, \bar{A}_1, \ldots, \bar{A}_{U-1}) \in \mathcal{A}^K \times \ldots \times \mathcal{A}^K = \mathcal{A}^{KU} \end{array} \right\} \quad (16)$$

achieves transmit diversity d and transmission rate R (KU) (M−d+1) bits per channel use, the maximum possible rate.

Proof: Let S and S' be distinct code words in S. Then $$S = \kappa\sum_{u=0}^{U-1} \eta^u \theta^{\sum_{k=0}^{K-1} 2^k \sigma_{u,k}(\tilde{A})}$$

$$= \kappa\sum_{u=0}^{U-1} \eta^u \theta^{\sum_{k=0}^{K-1} 2^k (\tau_{u,k}(\tilde{A})+a_{u,k}^{M\times T})}$$

$$= \kappa\sum_{u=0}^{U-1} \left[\eta^u \theta^{\sum_{k=0}^{K-1} 2^k a_{u,k}^{M\times T}} \odot \theta^{\sum_{k=0}^{K-1} 2^k \tau_{u,k}(\tilde{A})}\right],$$

where $a_{u,k}^{M\times T}$ denotes the constant M×T matrix whose every entry is $a_{u,k}$. Similarly, $$S' = \kappa\sum_{u=0}^{U-1} \left[\eta^u \theta^{\sum_{k=0}^{K-1} 2^k a_{u,k}^{M\times T}} \odot \theta^{\sum_{k=0}^{K-1} 2^k \tau_{u,k}(\tilde{A}')}\right].$$

Letting (u*, k*) denote the lexographically first index pair (u, k) for which $\sigma_{u,k}(\tilde{A})\neq\sigma_{u,k}(\tilde{A}')$, we have $$\Delta S = S - S' = \kappa\eta^{u^*}\theta^R \odot \theta^P \odot \left(\theta^{2^{k^*}}Q - \theta^{2^{k^*}}Q'\right) + \kappa\eta^{u^*+1}E', \quad (17)$$

where $$R = \sum_{i=0}^{K-1} 2^i a_{u^*,i}^{M\times T},$$

$$P = \sum_{i=0}^{k^*-1} 2^i \tau_{u^*,i}(\tilde{A}),$$

$$Q = \sum_{i=0}^{K-k^*-1} 2^i \tau_{u^*,k^*+i}(\tilde{A}),$$

$$Q' = \sum_{i=0}^{K-k^*-1} 2^i \tau_{u^*,k^*+i}(\tilde{A}'),$$

and $$E' = \sum_{i=0}^{U-u^*-2} \eta^i \left[\theta(\sigma_{u^*+i+1}(\tilde{A})) - \theta(\sigma_{u^*+i+1}(\tilde{A}'))\right].$$

Comparing (17) with (13), we see that the proof of Theorem 12 still applies.

C. Non-binary Alphabets

The constructions also generalize in a straightforward manner to the case of $p^K$-PAM, $p^K$-PSK, $p^{2K}$-QAM, and related constellations, when p≧2 is prime. The underlying algebra is essentially the same. If θ is a complex primitive $p^v$-th root of unity, then $\mathbb{Z}[\theta]/(1-\theta)\cong\mathbb{F}_p$; and, for 0≦l<v, $$\frac{\theta^{p^\ell m} - \theta^{p^\ell n}}{1 - \theta^{p^\ell}} \equiv \overline{m} \oplus_p \overline{n} \, (\mathrm{mod}\, 1 - \theta),$$

where $\overline{m}$ and $\overline{n}$ denote the modulo p projections of m and n, respectively, and $\oplus_p$ denotes modulo p addition. Thus, Propositions 1 and 2 extend naturally.

Theorem 12 therefore generalizes to the nonbinary case as follows.

Theorem 13 Let $p \geq 2$ be prime. Let A be a maximal M×T rank-d code over the alphabet $\mathbb{F}_p$. Let K and U be positive integers. Let κ be a non-zero complex number, θ be a complex primitive $p^K$-th root of unity, and η be a non-zero element of $p\mathbb{Z}[\theta]$. Let $\sigma: \mathbb{F}_p^{KU} \to \mathbb{F}_p^{KU}$ be an affine transformation whose linear part is nonsingular.

Then the modulated space-time code defined by $$S^\sigma = \left\{ \begin{array}{c} S = \kappa \sum_{u=0}^{U-1} \eta^u \theta^{\sum_{k=0}^{K-1} p^k \sigma_{u,k}(\tilde{A})} : \\ \tilde{A} = (\overline{A}_0, \overline{A}_1, \ldots, \overline{A}_{U-1}) \in \mathcal{A}^K \times \ldots \times \mathcal{A}^K = \mathcal{A}^{KU} \end{array} \right\} \quad (18)$$

achieves transmit diversity d and transmission rate R=(KU)(M−d+1)$\log_2 p$ bits per channel use, the maximum possible rate.

Proof: Straightforward adaptation of the proof of Theorem 12 to the non-binary case.

VI. Conclusion

We have shown that certain linear and affine transformations can be applied to the algebraic space-time code constructions by Lu and Kumar, while preserving their optimal rate-diversity trade-off property. The use of these transformations amounts to changing the way in which the modulator labels the constellation points. For $2^K$-PAM, $2^K$-PSK, and $4^K$-QAM, the proper choice of transformation yields new algebraic space-time codes that are compatible with Gray labelling.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, specification and claims support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A system of space-time coding for a radio system utilizing M transmit antennas and T symbol intervals, where M and T are integers satisfying $2 \leq M \leq T$, said system comprising:
 a) a digital signaling constellation with $p^m$ constellation points, with p a prime integer and $m \geq 2$ a positive integer;
 b) means for selecting the points in the digital signaling constellation via an address;
 c) means for computing a constellation point address from a vector of p-ary symbols of length m;
 d) transforming means that maps vectors of m p-ary symbols to transformed vectors of m p-ary symbols;
 e) at least one constituent p-ary code, each said constituent p-ary code being used to map sequences of source symbols to sequences of coded symbols;
 f) means for combining m p-ary code words from the constituent p-ary code to form a multi-level code word comprising $p^m$-ary coded symbols from the $p^m$-ary signaling constellation, said combining comprising taking an initial p-ary symbol from each of the m code words as a vector of length m, transforming the vector via the transforming means to produce a transformed vector, computing an address from the transformed vector via the address computation means, using the address to select a constellation point in accordance with the selection means, and repeating these steps for each of the next sets of p-ary symbols from the m code words; and
 g) means for distributing the $p^m$-ary coded symbols among the M transmit antennas and T symbol intervals for transmission.

2. The system of claim 1, wherein the constituent p-ary codes produce rank-d space-time codes, where $d \leq M$ is a positive integer, such that when the MT symbols produced by the distribution means are considered as forming a complex matrix with M rows and T columns, the difference between any two distinct such matrices has a rank of at least d.

3. The system of claim 2, wherein the combining means produces a rank-d $p^m$-ary space-time code under conditions in which the constituent p-ary codes are also rank-d and the transforming means is the identity transformation.

4. The system of claim 3, wherein the transforming means is an affine transformation.

5. The system of claim 4, wherein p=2.

6. The system of claim 5, wherein the signaling constellation is a phase-shift keying constellation, having a N-th constellation point that is proportional to $\theta^N$, where $\theta$ is a complex primitive m-th root of unity.

7. The system of claim 6, wherein the affine transformation has the Gray mapping property, such that when two input vectors are mapped to output vectors from which addresses are computed via the means for computing the address of the constellation points that are nearest neighbors, the two input vectors differ in exactly one coordinate.

8. The system of claim 5, wherein the signaling constellation is for pulse amplitude modulation, having an N-th constellation point that is proportional to $\Sigma_{k=0}^{m-1} 2^k (-1)^{a_k}$ where $a_0, a_1, \ldots, a_{m-1} \in \{0, 1\}$ and $N = a_0 + 2a_1 + \ldots + a_{n-1} 2^{n-1}$.

9. The system of claim 8, wherein the affine transformation has the Gray mapping property.

10. The system of claim 5, wherein the signaling constellation is for quadrature amplitude modulation whose N-th constellation point is proportional to $(1+i)\Sigma_{k=0}^{K-1} 2^{k_i a_k + 2 b_k}$, where $i=\sqrt{-1}$, $m=2K$, and $N=AB$, where A and B are positive integers with binary expansions $A = a_0 + 2a_1 + \ldots + 2^{K-1} a_{K-1}$, $B = b_0 + 2b_1 + \ldots + 2^{K-1} b_{K-1}$.

11. The system of claim 10, wherein the affine transformation has the Gray mapping property.

12. A computer-implemented method of space-time coding for a radio system utilizing M transmit antennas and T symbol intervals, where M and T are integers satisfying $2 \leq M \leq T$, said method comprising:
    a) creating a digital signaling constellation with $p^m$ constellation points, with p a prime integer and $m \geq 2$ a positive integer;
    b) selecting the points in the digital signaling constellation via an address;
    c) computing a constellation point address from a vector of p-ary symbols of length m;
    d) transforming means that maps vectors of m p-ary symbols to transformed vectors of m p-ary symbols;
    e) creating at least one constituent p-ary code, each said constituent p-ary code being used to map sequences of source symbols to sequences of coded symbols;
    f) combining m p-ary code words from the constituent p-ary code to form a multi-level code word comprising $p^m$-ary coded symbols from the $p^m$-ary signaling constellation, said combining comprising taking an initial p-ary symbol from each of the m code words as a vector of length m, transforming the vector via the transforming step to produce a transformed vector, computing an address from the transformed vector via the address computation step, using the address to select a constellation point in accordance with the selection means, and repeating these steps for each of the next sets of p-ary symbols from the m code words; and
    g) distributing the $p^m$-ary coded symbols among the M transmit antennas and T symbol intervals for transmission.

13. The method of claim 12, wherein the constituent p-ary codes produce rank-d space-time codes, where $d \leq M$ is a positive integer, such that when the MT symbols produced by the distribution means are considered as forming a complex matrix with M rows and T columns, the difference between any two distinct such matrices has a rank of at least d.

14. The method of claim 13, wherein the step of combining produces a rank-d $p^m$-ary space-time code under conditions in which the constituent p-ary codes are also rank-d and the step of transforming is the identity transformation.

15. The method of claim 14, wherein the step of transforming is an affine transformation.

16. The method of claim 15, wherein p=2.

17. The method of claim 16, wherein the signaling constellation is a phase-shift keying constellation, having a N-th constellation point that is proportional to $\theta^N$, where $\theta$ is a complex primitive m-th root of unity.

18. The method of claim 17, wherein the affine transformation has the Gray mapping property, such that when two input vectors are mapped to output vectors from which addresses are computed via the step of computing the address of the constellation points that are nearest neighbors, the two input vectors differ in exactly one coordinate.

19. The method of claim 16, wherein the signaling constellation is for pulse amplitude modulation, having an N-th constellation point that is proportional to $\Sigma_{k=0}^{m-1} 2^k (-1)^{a_k}$ where $a_0, a_1, \ldots, a_{m-1} \in \{0, 1\}$ and $N = a_0 + 2a_1 + \ldots + a_{n-1} 2^{n-1}$.

20. The method of claim 19, wherein the affine transformation has the Gray mapping property.

21. The method of claim 16, wherein the signaling constellation is for quadrature amplitude modulation whose N-th constellation point is proportional to $(1+i)\Sigma_{k=0}^{K-1} 2^{k_i a_k + 2 b_k}$, where $i=\sqrt{-1}$, $m=2K$, and $N=AB$, where A and B are positive integers with binary expansions $A = a_0 + 2a_1 + \ldots + 2^{K-1} a_{K-1}$, $B = b_0 + 2b_1 + \ldots + 2^{K-1} b_{K-1}$.

22. The method of claim 21, wherein the affine transformation has the Gray mapping property.

23. A computer program product for space-time coding for a radio system utilizing M transmit antennas and T symbol intervals, where M and T are integers satisfying $2 \leq M \leq T$, the computer program product comprising a computer-readable storage medium having computer-readable program code embodied in the medium, executed by a computer, the computer-readable program code comprising:
    a) computer-readable program code that creates a digital signaling constellation with $p^m$ constellation points, with p a prime integer and $m \geq 2$ a positive integer;
    b) computer-readable program code that selects the points in the digital signaling constellation via an address;
    c) computer-readable program code that computes a constellation point address from a vector of p-ary symbols of length m;
    d) computer-readable program code that transforms means that maps vectors of m p-ary symbols to transformed vectors of m p-ary symbols;
    e) computer-readable program code that generates at least one constituent p-ary code, each said constituent p-ary code being used to map sequences of source symbols to sequences of coded symbols;
    f) computer-readable program code that combines m p-ary code words from the constituent p-ary code to form a multi-level code word comprising $p^m$-ary coded symbols from the $p^m$-ary signaling constellation, said combining comprising computer-readable program code that takes an initial p-ary symbol from each of the m code words as a vector of length m, transforms the vector via the transforming means to produce a transformed vector, computes an address from the transformed vector via the address computation means, uses the address to select a constellation point in accordance with the selection means, and repeats these steps for each of the next sets of p-ary symbols from the m code words; and
    g) computer-readable program code that distributes the $p^m$-ary coded symbols among the M transmit antennas and T symbol intervals for transmission.

* * * * *